US006804582B1

(12) United States Patent
Gerhan

(10) Patent No.: US 6,804,582 B1
(45) Date of Patent: Oct. 12, 2004

(54) DIGITAL ELECTRODE OBSERVATION

(75) Inventor: Ronald Eric Gerhan, Clarksville, TN (US)

(73) Assignee: UCAR Carbon Company Inc., Wilmington, DE (US)

(*) Notice: Subject to any disclaimer, the term of this patent is extended or adjusted under 35 U.S.C. 154(b) by 591 days.

(21) Appl. No.: 09/669,199

(22) Filed: Sep. 25, 2000

(51) Int. Cl.[7] .................. G05B 21/00; G06F 19/00; H05B 7/06
(52) U.S. Cl. .................. 700/274; 700/110; 373/88; 702/34
(58) Field of Search .................. 700/108–110, 207, 700/209, 266, 274, 299, 300; 73/618, 865.8, 865.9, 866; 373/1, 2, 8, 9, 60, 88, 166; 348/82, 83; 702/33–36

(56) References Cited

U.S. PATENT DOCUMENTS

| | | | |
|---|---|---|---|
| 4,969,035 A | 11/1990 | Dawson | 348/83 |
| 5,099,438 A | 3/1992 | Gulden, Jr. et al. | 700/274 |
| 5,774,568 A * | 6/1998 | Freneix | 382/100 |
| 6,584,415 B1 * | 6/2003 | Uneme et al. | 702/34 |

FOREIGN PATENT DOCUMENTS

JP          40-4199107 A   *   7/1992

OTHER PUBLICATIONS

Japanese Patent No. J06108131–A Apr. 1994.
Exhibit A attached hereto is a page from an internal electrode performance report system previously utilized by the assignee of the present invention, which utilized a series of icons to identify various defect conditions present in electrode steps, no date.

* cited by examiner

Primary Examiner—Maria N. Von Buhr
(74) Attorney, Agent, or Firm—Waddey & Patterson; James R. Cartiglia

(57) ABSTRACT

A system is provided for recording information relating to the condition of electrodes in an electric arc furnace. An imaging apparatus is provided in a consistent position relative to an imaging station. Periodically, the electrode columns are removed from the furnace and moved to a position such that the electrode column is placed at the imaging station. Then an image of the electrode column is created with the imaging apparatus, and the images are stored in a memory of a computer for subsequent analysis.

13 Claims, 6 Drawing Sheets

DIGITAL ELECTRODE OBSERVATION

BACKGROUND OF THE INVENTION

1. Field of the Invention

The present invention relates generally to systems for observing and recording data relating to an article, and more particularly, but not necessarily by way of limitation, to a system for recording images, such as digital photographs, of at least a portion of an electrode utilized in an electric arc furnace, such as the stub end of the electrode, in order to record characteristics of the electrode.

2. Description of the Prior Art

One technique currently used for steel making is the use of an electric arc furnace that operates as a batch melting process producing batches of molten steel known as heats. The electric arc furnace operates on a cycle that includes the steps of furnace charging, melting, refining, de-slagging, tapping and furnace turn around. Modern electric arc furnace operations have a tap-to-tap time of approximately 60 minutes or less.

One of the most important elements in the electric circuit that provides the energy to melt the scrap steel in the electric arc furnace, is the electrode or electrodes. These electrodes deliver the electric power to the furnace in the form of an electric arc between the electrodes and the scrap steel and other materials making up the furnace charge that is to be melted. Electrodes come in two forms: amorphous and graphitic carbon, or graphite. Graphite electrodes are typically used in modern steel making.

The graphite electrodes are continuously consumed during the heating process in the electric arc furnace. Historically, electrode consumption has been as high as 12 to 14 pounds of graphite per ton of steel.

The electrodes are typically provided in cylindrical sections having threaded connections formed in each end thereof. The threaded sections are joined together to form a column of several electrode sections, which electrode column is adjustably placed within the furnace by a movable electrode holder arm that can raise and lower the electrode column, and can pivot to move the electrode column away from the furnace.

Electrodes are commonly available in sizes from 15 to 30 inches in diameter and in varying lengths up to about 10 feet.

In an AC electric arc furnace, there will be three electrode columns. In a DC electric arc furnace, there are one or two electrode columns.

During the steel making operation, the electrode column or columns are typically removed from the furnace at the end of each heat, and they may also be removed from the furnace during a heat in order to add additional charge materials to the furnace.

Historically, the performance of the electrode columns has been measured only in a gross fashion, such as cumulative monthly totals, so as to provide numbers such as the pounds of graphite required per ton of steel during the long term operation of the steel mill.

The physical condition of the electrode column has been visually observed during those instances when the electrode column is removed from the furnace, and from time to time anecdotal data may be observed and recorded in a manual fashion to describe the observed condition of the electrode column.

Furthermore, no attempt has been made to trace the identity of a given electrode section so that its observed performance can be correlated to various historical data such as operational parameters of the furnace, or manufacturing processes, raw materials employed, etc.

Accordingly, there is a need in the art for systems capable of viably monitoring and recording the condition or characteristics of the electrode column so as to permit subsequent analysis of and optimization of various operating parameters for the furnace and manufacturing processes associated with quality control.

SUMMARY OF THE INVENTION

The present invention provides methods and apparatus for recording information relating to the condition or characteristics of electrodes in an electric arc furnace. An imaging apparatus, such as a digital camera, capable of recording an image or other characteristics of the electrode is provided in a consistent position relative to an imaging station, such as a slip stand of the electric arc furnace. Periodically, when the electrode column is removed from the furnace, the stub end of the electrode column is placed upon the slip stand, and an image of the electrode column is made, such as with the digital camera. The images, such as digital photographs may then be stored for later analysis.

Preferably, the system also includes means by which the identity of a given electrode section, that comprises the electrode or portion thereof shown in a given image, can be identified and traced back through both its manufacturing process and its subsequent operational environment, so that the observed condition and/or characteristics of the electrode may then be correlated to one or more of those historical events to aid an improved quality control and optimization of both the electrode manufacturing process and the steel making process.

A unique system is provided for defining, and assigning numerical values to a plurality of recurring defective conditions or other characteristics. The numerical values are preferably assigned in a ranked numerical series that is constructed such that each possible sum value for the conditions present in a given electrode corresponds to a unique combination of defined conditions. The numerical series may be a binary series.

It is therefore an object of the present invention to provide improved methods and apparatus for observing and recording data corresponding to the condition or characteristics of an electrode column in an electric arc furnace.

Another object of the present invention is the provision of unique systems for defining and recording the observed conditions or characteristics utilizing numerical values representative of the observed conditions or characteristics.

Still another object of the present invention is the provision of systems that allow the subsequent analysis of recorded data for use in optimizing manufacturing processes, raw material selection and operational processes associated with the electrodes.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
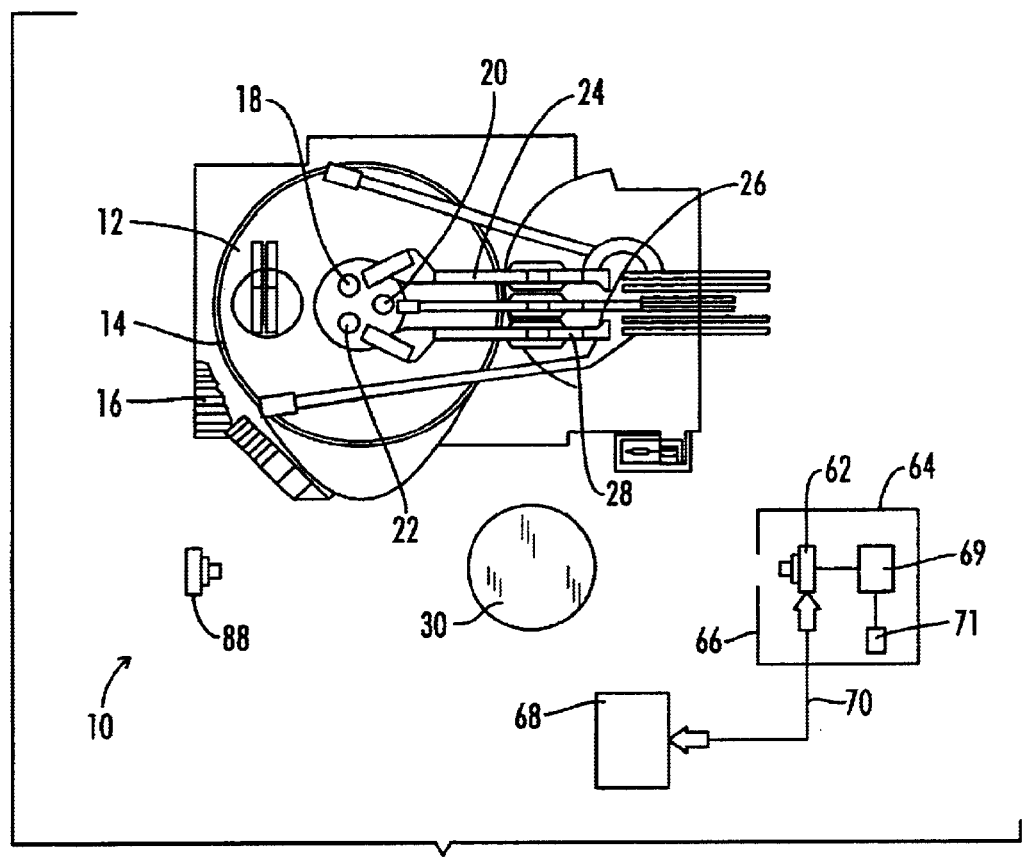
FIG. 1 is a plan schematic view of an AC electric arc furnace having three electrode columns in place therein. Adjacent the furnace is schematically illustrated a slip stand, an observation pulpit, two digital cameras, and a computer for recording the digital images from the cameras and other associated data.

Referring now to the drawings, and particularly to FIG. 1, the system for creating records, such as photographic records, of the electrode column of an electric arc furnace is shown and generally designated by the numeral 10.

An electric arc furnace 12 is shown in plan view. A circular furnace shell 14 is located above a working platform 16. First, second and third electrode columns 18, 20 and 22 are supported in place within the furnace shell 14 by first, second and third electrode holder arms or carrier arms 24, 26 and 28.

Located adjacent the furnace 12 is a slip stand 30. As will be understood by those skilled in the art, each of the electrode column holder arms 24, 26, and 28 is pivotable relative to the furnace 12 so that the associated electrode can be placed above the slip stand 30 and then lowered onto the slip stand 30 as is best illustrated in FIG. 3.

Figure 3:
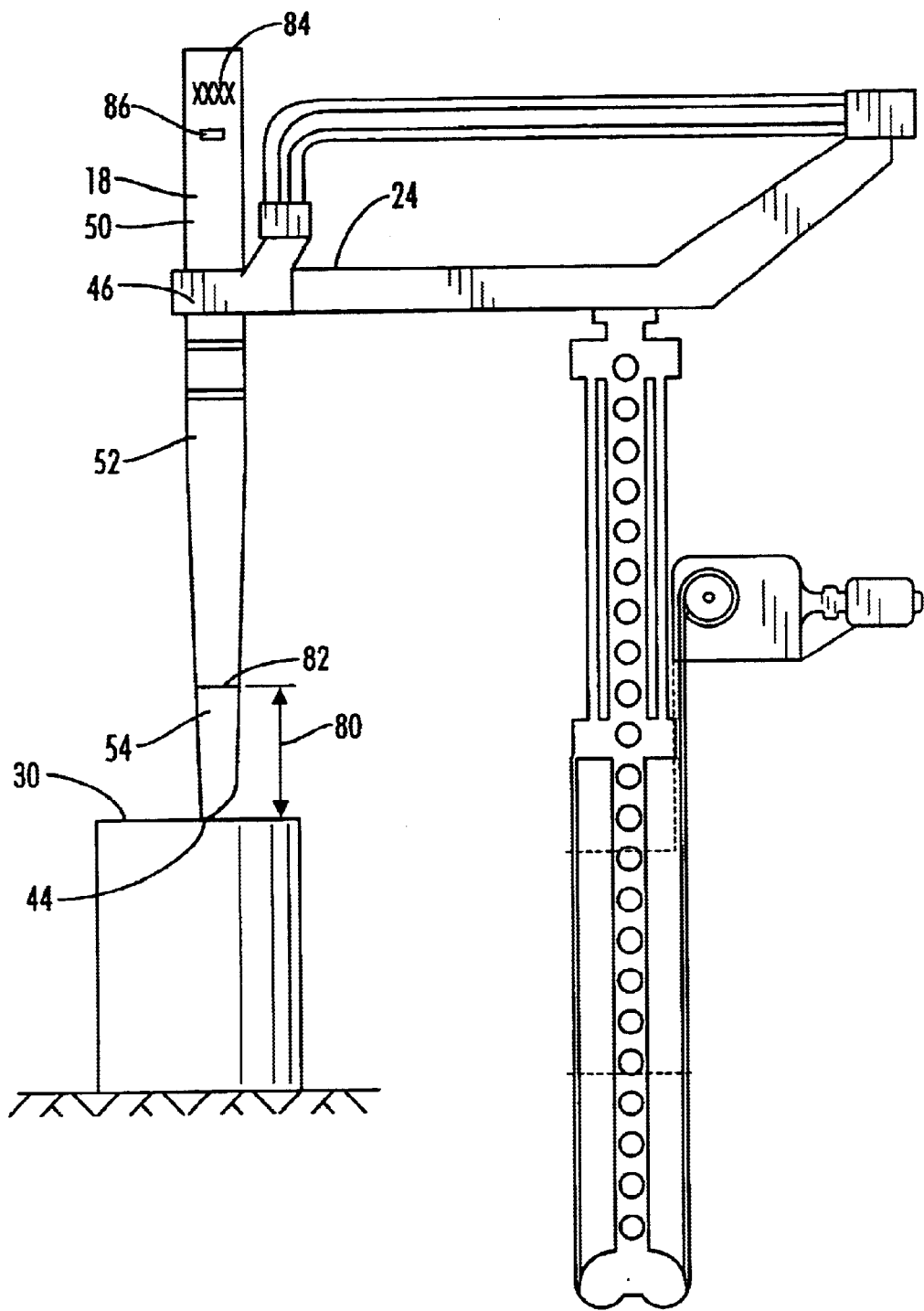
FIG. 3 is a schematic illustration similar to FIG. 2, showing the electrode column having been moved by the electrode holder arm into a photographing position on a slip stand.

Referring now to FIG. 3, one example of an electrode holder arm 24 and associated structural apparatus for moving the electrode column 18 is schematically illustrated. The electrode holder arm 24 is supported on a mast 32. An electric motor 34 drives a rotating drum 36 about which is wound a cable 38 that extends past lower rollers 40 and 42. As the mast support cable 38 is wound or unwound upon the drum 36, the mast 32 will be raised or lowered, respectively, relative to the furnace shell 14, thus raising and lowering the electrode holder arm 24 and the electrode column 18. The electrode holder arm 24 may also pivot about the mast 32 so that the electrode column 18 can be pivoted to a position as shown in FIG. 3 wherein butt end 44 of the electrode column 18 is in place upon the slip stand 30. The slip stand 30 is commonly used to support the electrode column 18 when the electrode arm 24 is being repositioned upon the electrode column 18. As will be understood by those skilled in the art, the electrode arm carries an electrode clamp 46 on its distal end, that can be released from the electrode column 18 and moved to a new position upon the electrode column 18, so as to subsequently adjust the depth to which the electrode column 18 is inserted into the furnace shell 14.

Another method of adjusting the position of the electrode column 18, is to suspend the electrode column 18 from a crane (not shown) attached to its upper end. Then the clamp 46 can be opened and repositioned while the electrode column is held in place by the crane.

Figure 2:
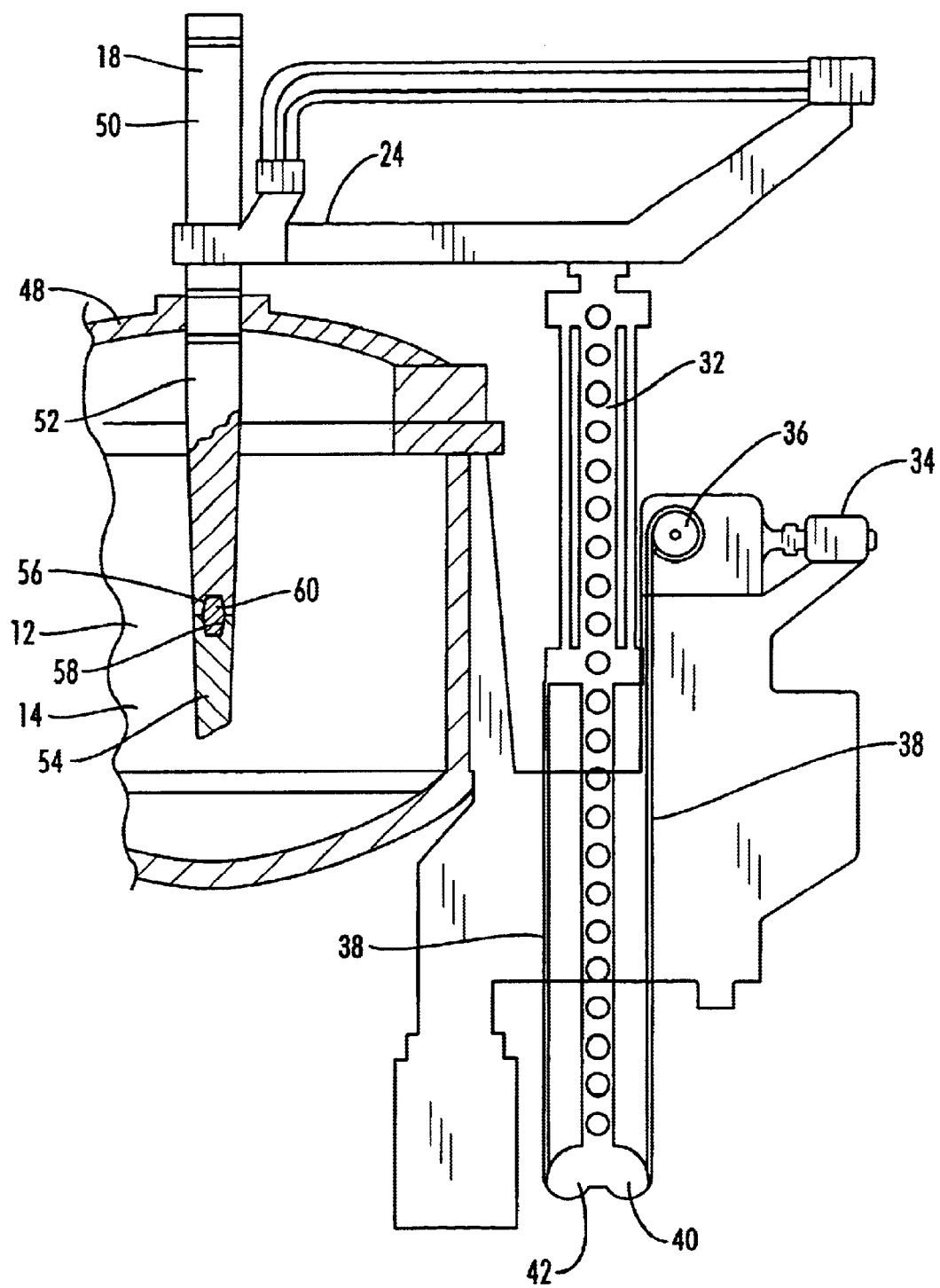
FIG. 2 is a schematic elevation partially sectioned view of an electric arc furnace and an electrode column in place therein, along with the associated mast and electrode holder arm.

Although a cable type mast is illustrated in FIGS. 2 and 3, the mast may also be controlled by hydraulic cylinders, or any other suitable mechanism for providing vertical and pivotal motion of the electrode arm 24 in order to control the position of the electrode column 18 within the furnace 12, and to remove the electrode column 18 from the furnace 12 as needed during the operation of the furnace.

The furnace 12 also includes a roof 48. During typical removal of the electrode columns between heats, the roof 48 may be removed intact with the electrode columns. Also, from time to time the electrode columns may be completely removed through the roof 48.

Each of the electrode columns such as column 18 is made up of a plurality of electrode sections, in this case segments 50, 52 and 54.

As is illustrated in FIG. 2, each electrode section includes a threaded socket 56 in its lower end and a threaded socket 58 in its upper end. A threaded pin 60 is threaded into both the sockets 56 and 58 provide a secure physical and electrical connection between the adjacent electrode sections.

The electric arc furnace 12, the slip stand 30, and the various apparatus supporting the electrode columns 18, 20 and 22, described to this point in this specification, are all a part of the prior art and are present in any conventional electric arc furnace operation.

Each of the arms such as electrode arm 24 may be described as being movable through a range between a position like that shown in FIG. 2 wherein the electrode column is in place within the furnace 12 and a position like that shown in FIG. 3 wherein the electrode column is supported upon the slip stand. The slip stand 30 can be described as being located within that range so that the electrode arm 24 can place the electrode column 18 upon the slip stand 30, which in the system 10 will serve as a imaging station or photographing station 30. Similarly, the electrode arm 24 can move the electrode column to the position of the crane (not shown) described above, that also serves as an imaging station.

As shown in FIG. 1, the system 10 includes a first digital camera 62 that is located in a fixed position relative to the imaging station 30. Preferably the first digital camera 62 is located within an enclosure commonly referred to as a observation pulpit 64 within which the human operator who is observing the furnace operation is typically located. Thus, the first camera 62 views the imaging station 30 through a transparent window 66 that protects the camera 62 from the heat of the furnace 12.

By maintaining the first camera 62 in a fixed position relative to the slip stand 30, and by consistently placing the electrode columns 18, 20 or 22 that are to be photographed in a consistent position in the center of the slip stand 30, the digital photographs that are taken of the butt end of each electrode column will be of the same scale, so that measurements of stub end length, stub diameter, and the like can be determined by applying a common scale to measurements taken from the photographs themselves. It will be understood that such a scale can be easily determined by simply placing an article in the imaging station 30, taking a digital photograph, then measuring the dimensions of the physical article and comparing those to the dimensions on the photograph. Then so long as the camera settings are maintained, subsequent photographs taken with the same camera of objects at the same location can be compared utilizing the same scale.

Although the slip stand 30 has been described herein as the preferred photographing station, it will be appreciated that any other repeatable location of the electrode column could be utilized. The electrode column could be suspended from a crane as described above. Also, if sufficiently precise control of the carrier arms is provided, the electrode columns could be simply withdrawn from the furnace and held at an identifiable location in space. For example, the photographs shown in FIGS. 5–9 were taken with the electrode column raised 18 inches above the slip stand, in order to accommodate the position of camera 68. The slip stand, the crane or the identifiable location in space can all serve as the photographing station.

The system 10 further includes a computer 68 that includes a memory section in which a database including digital copies of the various photographs are stored. The digital data representing the images recorded by the camera 62 may be transferred from the camera 62 to the computer 68 in a variety of ways that are schematically illustrated by the connection 70. The images may in fact be transmitted over a communication cable as represented by 70. This transmission of data can be via any standard video transmission format, including composite video, S video, RGB or any other available format. The video signal is carried via cable 70 to an internal frame grabber card in computer 68, that converts the video signal and stores it as a digital image in the computer memory. The frame grabber card may, for example, be a Flashbus MVPro, available from Integral Technologies of Indianapolis, Ind. In a more rudimentary form of the invention, the images may be recorded on a memory device such as a floppy disc or CD, or other such device, which device can then be physically moved to an input device associated with computer 68. For example, the floppy disc may be placed within a floppy disc drive of the computer 68 and the data read therefrom into the computer memory. It will be appreciated that in its broadest sense the present invention involves any transfer of the recorded digital data from the camera 62 to the computer 68 whether the same be completely automated, or whether human steps are involved in transferring the data.

The system 10 preferably will include a means for automatically triggering the camera 68 to take the photograph once the electrode column 18 is properly positioned at the photographing station. For example, for the photographs shown in FIGS. 5–9, the camera 68 was triggered by a signal from a programmable logic controller 69 that was connected to sensors, such as 71, monitoring mast position and the open/closed status of the clamp 46. When the programmable logic controller determined that the clamp had been opened, the mast had been moved, the clamp had been closed, and the mast had then been raised 18 inches, the trigger signal was generated and sent to camera 68.

Alternatively, the programmable logic controller 69 can be replaced by a software program in computer 68, plus input devices to provide the clamp open/closed and mast position signals to the computer.

The sensor 71 is only schematically illustrated in FIG. 1. It will be understood that the sensor 71 will be attached to the mast and/or clamp, or to some component thereof.

Although the system 10 has been described utilizing a single camera 62, it will be appreciated that an improvement and more complete data can be provided by including at least one additional camera 88 positioned such that the view of the combined cameras encompasses 360° around the imaging station 30, so that the electrode can be viewed from all angles to record all defects present therein. An even further improved system would include three or more cameras spaced around the circumference of the imaging station 30.

Although the system 10 has been described in the context of a digital camera, it will be appreciated that in a broader context, the invention can be implemented through the use of a non-digital camera from which printed conventional photographs are produced, so long as the camera is maintained in a consistent position relative to the photographing station 30, so that the resulting photographs are of common scale. When utilizing a conventional camera, the printed paper photographs can be stored in physical paper files, and can be examined using a common scale by various mechanical measurement means.

It will further be appreciated that many other types of imaging apparatus could be used. For example, ultrasonic imaging, X-ray imaging, cat-scan imaging, and other such technologies could all be used to create both external and internal images of the electrode column.

Defect Classification System

Figure 4:
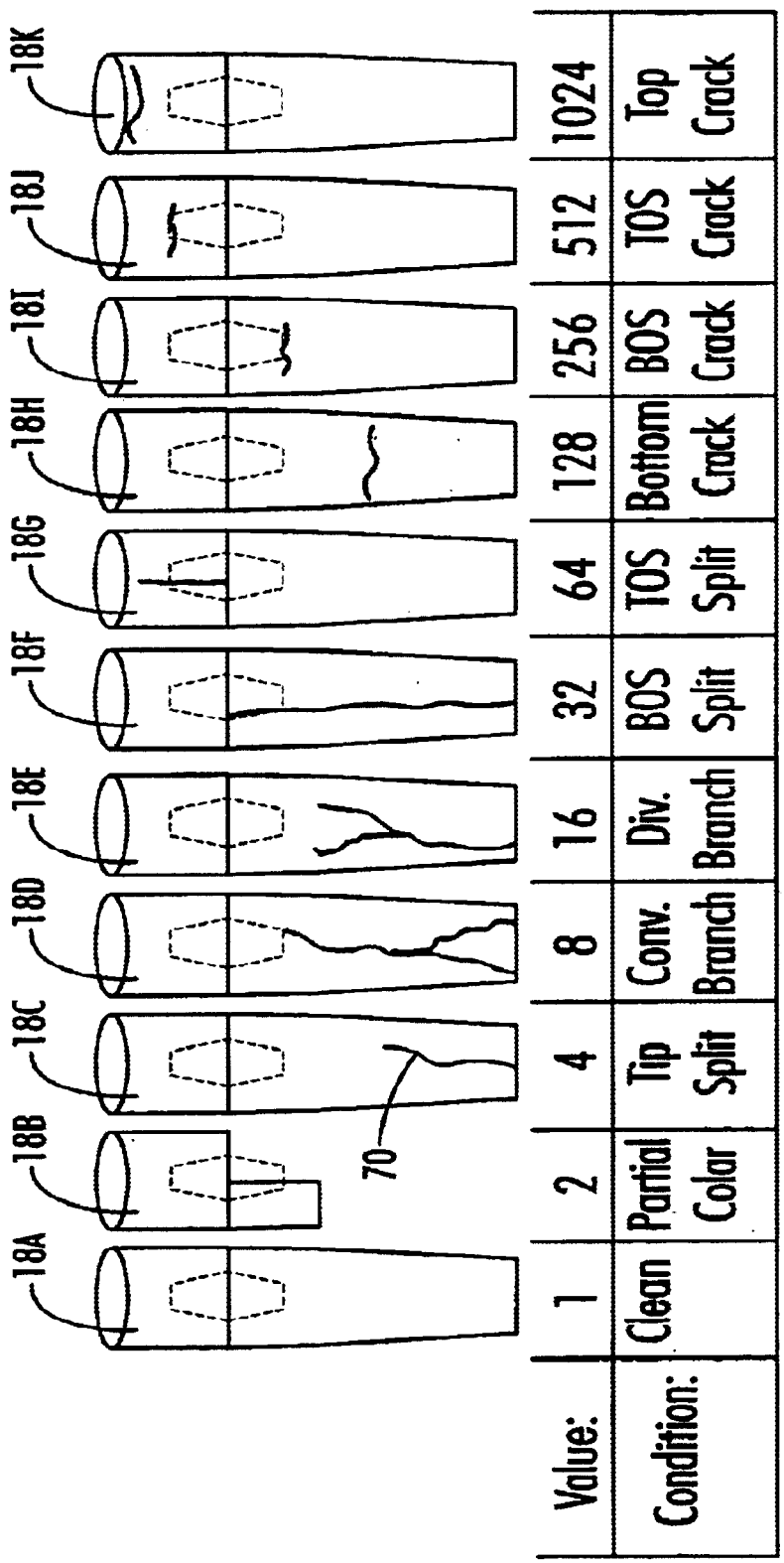
FIG. 4 comprises an array of schematic illustrations representative of a plurality of pre-defined failure conditions, and in tabular form associated therewith is a series of assigned numerical values and condition definitions.

A unique system of analyzing and cataloging the characteristics or defects observed when examining the images taken by the system 10 has also been developed. As will be appreciated by those skilled in the art, there are many different types of defective conditions that recur on a regular basis in electrodes. FIG. 4 comprises a series of schematic illustrations of the types of defects that commonly occur. Located below each schematic illustration is a numerical value that has been assigned to that type of defect. Located below the numerical value is a brief description of the condition or type of defect illustrated.

Furthermore, the defects have been arranged from left to right in FIG. 4 in order of the severity of the defect, with the most severe defect being on the right hand end. The numerical values assigned are in a binary series such that the first condition is assigned the number 1, the second condition is assigned the number 2 which is twice the first value, the third condition is assigned the number 4 which is twice the second value, the fourth condition is assigned the number 8 which is twice the third value, etc.

Starting at the left hand end, the electrode column designated 18A is a clean column with no defects to which the numerical value 1 has been assigned.

The next condition illustrated by electrode column 18B is a partial collar to which the numerical value 2 has been assigned.

The next example 18C illustrates a split tip as denoted by the vertical crack 70 that runs from the butt end of the electrode. The numerical value 4 has been assigned to this condition.

The next example 18D illustrates a converging branch crack, to which the numerical value 8 has been assigned.

The next example 18E illustrates a diverging branch crack to which the numerical value 16 has been assigned.

The next example 18F illustrates a bottom of socket split to which the numerical value 32 has been assigned.

The next example 18G illustrates a top of socket split to which the numerical value 64 has been assigned.

The next example 18H illustrates a bottom crack to which the numerical value 128 has been assigned.

The next example 18I illustrates a bottom of socket crack to which the numerical value 256 has been assigned.

The next example 18J illustrates a top of socket crack to which the numerical value 512 has been assigned.

The next example 18K illustrates a top crack to which the numerical value 1024 has been assigned.

When analyzing the condition of a particular electrode stub as shown in one of the digital photographs taken by the system 10, that condition can be represented as a combination of one or more of the conditions illustrated in FIG. 4.

Figure 5:
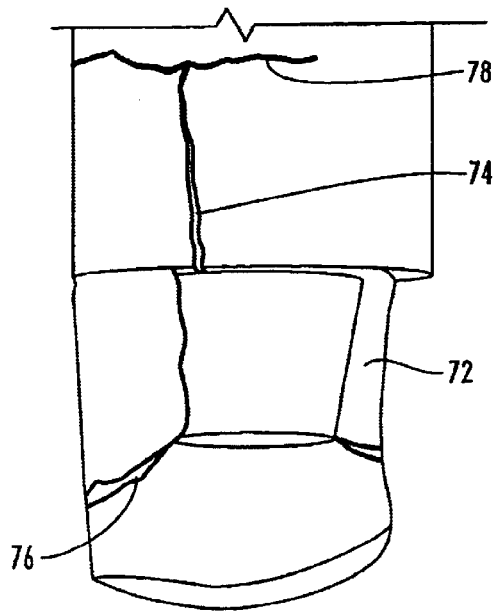
FIG. 5 is a photographic illustration of one of the digital photographs of an electrode stub end illustrating a partial collar, a top of socket split, a bottom of socket crack and a top of socket crack.

For example, FIG. 5 is a photograph illustrating an electrode stub having the characteristics of a partial collar 72, a top of socket split 74, a bottom of socket crack 76, and a top of socket crack 78. These characteristics have respective values of 2, 64, 256, and 512 according to my rating system. A rating that would capture the characteristics of this stub would be 834, or simply the sum of the individual characteristic values. It is significant to note that the intent of this rating is not to infer that a top of socket crack is twice as bad as a bottom of socket crack, but to rather provide for unique characteristic identification while still indicating a relative measurement of severity.

It is noted that this sum 834 is unique to the combination of partial collar, top of socket splitting, bottom of socket cracking and top of socket cracking. There is no other combination of defects that will result in a sum of characteristic values equal to 834. Thus, with the inventive unique defect identification system, each possible sum value corresponds to a unique combination of defined defective conditions.

The system illustrated above utilizes a binary series. Other examples would include any numerical base where successive assigned values were incremental increases in exponential value, for example $3^0$, $3^1$, $3^2$, $3^3$, etc. or $4^0$, $4^1$, $4^2$, $4^3$, etc.

Additionally, since the defects have been ranked in order of severity, the sum of the assigned values is representative of the overall severity of the damage that has occurred to the sample being observed.

Thus, one mode of analysis of the digital photographs taken by the system 10 is to examine each of the photographs to determine whether or not each of the predefined conditions illustrated in FIG. 4 is present, and to then record that data and to determine a sum of the assigned values that is indicative of both the overall degree of damage to the electrode, and that is representative of a unique combination of previously defined defects.

This process may be performed by human observation of the digital photographs and entry of the presence or absence of each of the pre-defined defective conditions into a database, from which the assigned values can be determined and the summation thereof calculated and again stored in the database of the computer 68 in association with other data corresponding to the electrode section in question.

It is also anticipated that the process can be implemented either partially or completely by machine observations.

Thus, the computer 68 will have a plurality of condition data files stored therein, each condition data file corresponding to an observed physical condition of the electrode column shown in one of the digital photographs. Each condition data file will include data indicating the observation of one or more of the plurality of defined recurring defective conditions in the associated digital photograph. Each of the condition data files will also include data representative of the sum of assigned values for all of the observed defined recurring defective conditions.

In its broadest embodiment, the use of the unique numeric value assignment system can be described as a method of tracking a combination of characteristics relating to one of a plurality of articles. The method includes defining a plurality of recurring characteristics for such articles. Then assigning to each of the recurring characteristics a unique assigned numerical value, the values comprising a series constructed such that each possible sum of assigned numerical values corresponds to a unique combination of defined characteristics. Then determining whether each of the plurality of recurring characteristics is present for one of the articles. Then summing the assigned numerical values of the characteristics present for said one article to obtain a sum corresponding to said one article.

While this system has been specifically disclosed in the context of a method for tracking a combination of defective conditions in one of a plurality of electrodes of a furnace, similar systems could be utilized in many other processes.

For example, such a system could be utilized to track the manufacturing process for the electrodes where the electrode passes through a plurality of steps, some of which are variable, and each variable step of which has a unique assigned numerical value according to the system described above. Thus, the resulting numerical sum of the manufacturing process is encountered by the electrode would be representative of the unique series of process stubs encountered by that particular electrode.

Other Modes of Observation

Another physical parameter of the electrode column that is desirable to record is the stub length 80, which is defined as distance from the butt end 44 to the joint 82 between the intermediate electrode section 52 and the lowermost electrode section 54 as shown in FIG. 3.

If the scale of the digital photograph is known, this length 80 can easily be measured by measuring the length on the photograph and applying the known scale. The means of accomplishing this is through the use of a software program such as the ImagePro program, available from Media Cybermedics of Silver Springs, Md., that can automatically measure the distance between two identifiable points on a digital drawing or photograph. Thus, the human operator of the program identifies the lowermost point on the butt end 44 and identifies a point on the joint 82 immediately above the lowermost point, and the software program can immediately determine the distance between those two points that corresponds to the stub end length 80. This data can then be stored in the memory of the computer 68 and associated with the other data corresponding to the lowermost electrode section 54.

Another manner in which the digital photographs may be utilized to obtain useful data corresponding to the performance of the electrode is through the comparison of consecutive photographs of a given stub end, which consecutive photographs are taken at the end of a series of heats or other events. For example, FIGS. 6, 7 and 8 comprise three consecutive photographs of a stub end electrode section 54.

Figure 6:
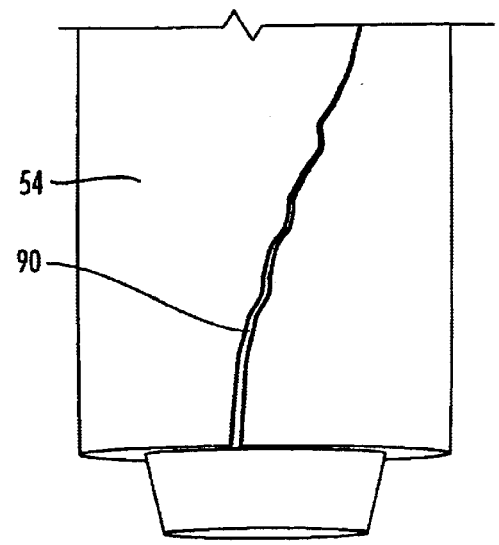
FIG. 6 is a first photographic illustration of stub end of an electrode section.

FIG. 6 represents the condition of the stub end section 54 after the next lower electrode segment has broken away, and the stub end section 54 is substantially undamaged.

Figure 7:
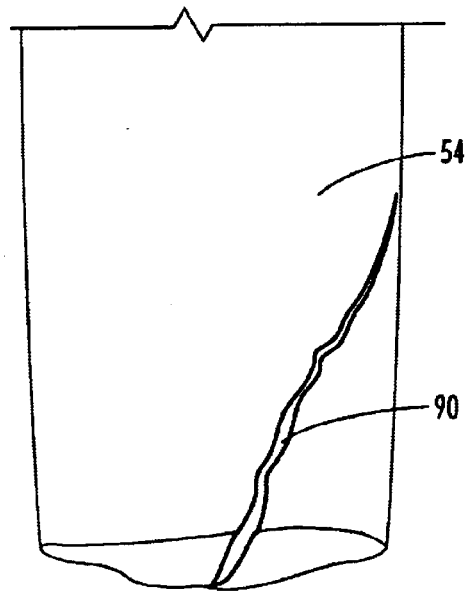
FIG. 7 is a second subsequent view of the stub end of the electrode section of FIG. 6, after the stub end has partially eroded during operation.

FIG. 7 is a photograph of the same stub end section 54 after one heat has been performed.

Figure 8:
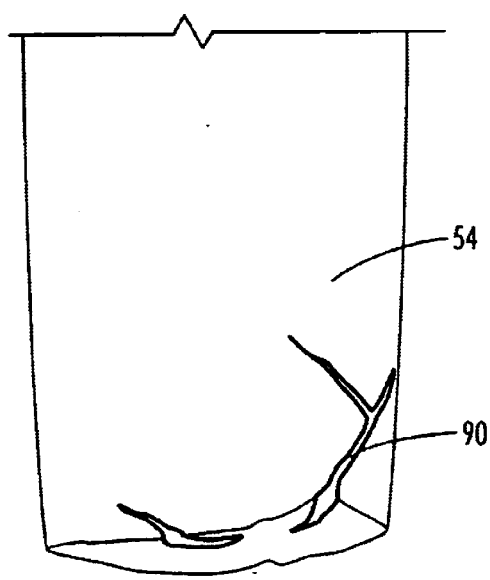
FIG. 8 is a third sequential view of the stub end of FIGS. 6 and 7, after still further erosion.

FIG. 8 is a photograph of the same stub end after a second heat has been performed. It is apparent in comparing FIG. 6, 7 and 8, that the stub end electrode section 54 is slowly being consumed in use.

As is apparent in FIGS. 6, 7 and 8, there is a tip split 84 present in the electrode section 54.

Figure 9:
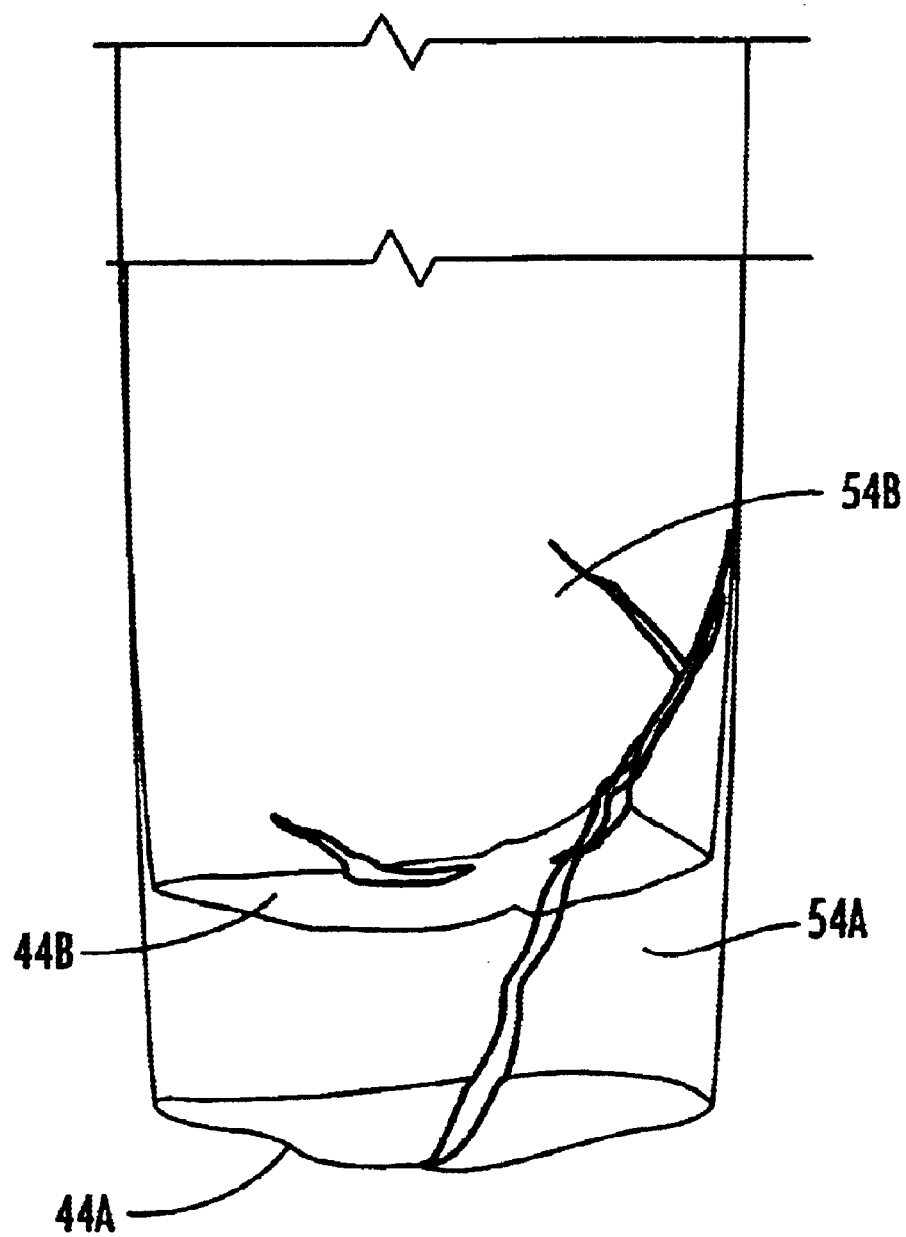
FIG. 9 is a photographic illustration of FIG. 8 overlaid on FIG. 7 to illustrate the manner in which the volume of electrode consumption between heats can be calculated.

FIG. 9 illustrates a technique by which the two consecutive photographs such as FIGS. 7 and 8 may be utilized to calculate the actual volume and poundage of the electrode that is consumed during the single heat of the electrical arc furnace, that occurred between photographs 7 and 8.

In FIG. 9, the image of FIG. 8 has been overlaid upon the image of FIG. 7, and the common portions of the split 84 have been aligned. In FIG. 9, the butt end of the electrode as shown in FIG. 7 is designated by 44A, and the butt end as shown in FIG. 8 is designated as 44B.

The volume of the electrode 54 at the time of FIG. 7 can be calculated by measuring the stub length 80, and measuring the diameter at one or more locations and calculating the volume therefrom. The volume of the stub end electrode 54 in FIG. 8 can be calculated in a similar manner, and the volume of electrode consumed between the two photographs is simply the difference between the two calculated volumes.

Another method of determining consumption during a heat is to determine consumption by length of the electrode column. This can be done using two auxiliary furnace inputs, namely the mast position in inches, and the electrode clamp position, either open or closed. A mast position reading can be recorded both before and after a heat and the consumption then calculated from the difference. This method of determining linear consumption requires an operational procedure of placing the electrode on the slip stand, and the clamp be open prior to each heat, and also before and after swapping electrode columns.

Thus, with the data that is available from the digital photographs, and with analysis techniques such as those described above, very accurate determinations can be made of the exact poundage of electrode consumed during a single heat of the electric arc furnace 12. Thus, a much more accurate measurement of electrode performance is provided than with the gross techniques of the prior art, and more significantly this data is correlated to a specific electrode section, and can in turn be correlated to other data that has been recorded relevant to that electrode section, such as manufacturing conditions when the electrode was manufactured and such as operating conditions when the electrode was present in the furnace 12.

It will be apparent that through the techniques described above, a great detail of very specific information on the performance of each electrode can be obtained, and it can then be correlated with any other historical parameters of the electrode section.

For example, various operating parameters relating to the operating conditions in the furnace 12 when the electrode is present, may be measured and recorded with a system like that shown in U.S. Pat. No. 5,099,438 to Gulden, Jr., et al., and assigned to the assignee of the present invention, which disclosure is incorporated herein by reference. The computer will have a plurality of historical operational data files stored therein corresponding to the furnace operating conditions experienced by the electrode column.

Other historical data, such as data relating to the process by which the particular electrode section was manufactured can be recorded and stored in association with all of the other data corresponding to a given electrode section, to allow analysis collectively of all of the data to determine what correlations might be present between electrode performance and historical manufacturing and/or operating conditions. It will be apparent that by studying such correlations, both the manufacturing process and the operation of the electric arc furnace can be improved and optimized.

One factor that is important to the optimum usage of the system 10 is to provide reliable means for identifying each individual electrode section. This can be accomplished in several ways.

FIG. 3 schematically illustrates the use of visual identification indicia 84 and/or a machine detectable identification tracer 86, such as a radio frequency identification tag, embedded in the electrode section. By either system, the upper electrode section 50 can be specifically identified at the time it is added to the upper end of the electrode column 50. Then, due to deterioration or destruction of the identifying marker as the electrode section progresses downward toward the end of the electrode column, it is desirable to visually track the electrode section, such as by recording through photographs each subsequent change made to the electrode column. This could for example be accomplished through the use of an additional camera (not shown) to monitor mast arm position and slipping distances when the position of the electrode column is adjusted on the slip stand. Also, if an embedded tracer is capable of withstanding the extreme heat conditions present in the furnace, it could also be possible to continue to directly identify the electrode section as it moved downward through the electrode column.

Alternatively, if each individual electrode section is not specifically identified, it is also possible to identify groups of electrode sections, such as a group that is of common manufacture and origin, and to collectively record the data for all members of that group and analyze the data for the group.

Summary of Methods of Operation

The methods of recording information utilizing the system 10 include generally the following steps. The digital camera 62 is provided in a consistent position relative to the imaging station 30 defined by the slipping station. Periodically, when the electrode column 18, 20 or 22 is removed from the furnace, such as at the end of a heat, or when adding additional charge during a heat, the electrode column is moved by its associated electrode holder arm to the imaging station 30 and the stub end of the electrode column is placed on the imaging station 30. Then a trigger signal is sent to camera 68 and the stub end of the electrode column is photographed with the digital camera 62, and the digital photograph is stored in the memory of the computer 68.

Then the stored digital photographs can be analyzed in the various ways described above to determine the physical condition of the stub end of the electrode column. This data can be correlated to various historical data for the electrode section in question, including both manufacturing data and operational performance data in the furnace.

The resulting data can be analyzed in many ways.

The data can be grouped to identify recurring failure patterns in the electrode assemblies, and to correlate those failure patterns to either manufacturing processes and/or operational parameters encountered in the furnace. Stub end lengths and volumes can be measured and translated into measurements of electrode consumption by the furnace.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A method of recording information relating to the characteristics of electrodes in an electric arc furnace, the method comprising:

(a) providing an imaging apparatus in a consistent position relative to an imaging station;

(b) periodically removing an electrode column from the furnace, and moving the electrode column to the imaging station;

(c) imaging the electrode column with the imaging apparatus when the electrode column is located at the photographing station;

(d) storing the images of the electrode column; and (e) analyzing the stored images to determine the physical condition of the electrode column shown in each image, wherein analyzing the stored images comprises defining a plurality of recurring defective conditions;

examining the stored images to identify whether each of the defined conditions is present; and recording data indicating whether any of the defined conditions is present in each image.

2. The method of claim 1, wherein:

in step (a), the imaging apparatus is a digital camera; and in step (d), the storing step includes storing an electronic digital copy of the image in a digital memory.

3. The method of claim 1, wherein:

in step (a), the imaging apparatus is a non-digital camera from which printed photographs can be produced; and in step (d), the storing step includes storing the printed photographs in physical paper files.

4. The method of claim 1, wherein:

in step (a), the imaging station is a slip stand; and in step (b), a stub end of the electrode column is placed on the slip stand.

5. The method of claim 1, wherein:

the analyzing step includes measuring a stub length in each image, using a common scale applied to all of the images, thereby eliminating observer subjectivity in determining stub length.

6. The method of claim 1, wherein the analyzing step further includes:

assigning to each of the defined conditions a unique numerical value; and for each image, summing the numerical values corresponding to the defined conditions that are present, to provide a numerical indication of overall condition of the electrode column as shown in each image.

7. The method of claim 6, wherein:

the assigned numerical values comprise a series ranking the defined conditions in order of severity, so that the sum value for each image provides a relative measurement of severity of physical damage depicted in the image.

8. The method of claim 6, wherein:

the assigned numerical values comprise a numerical series constructed such that each possible sum value corresponds to a unique combination of defined conditions.

9. The method of claim 1, further comprising:

identifying an electrode section of the electrode column and correlating the observed characteristic to the identification of the identified electrode section.

10. The method of claim 9, further comprising:

recording at least one historical parameter for the identified electrode section; and correlating the observed characteristic to the historical parameter.

11. The method of claim 1, wherein:

step (c) includes a step of automatically triggering the imaging apparatus when the electrode column is located at the imaging station.

12. A system for creating image records of an electrode column of an electric arc furnace to document characteristics of the electrode column, comprising:

an electric arc furnace, including an electrode column carried by an electrode carrier arm, the arm being movable through a range;

an imaging station located within the range of the arm, so that the arm can place the electrode column at the imaging station;

an imaging apparatus, located in a fixed position relative to imaging station, so that a plurality of images taken of the electrode column at the imaging station by the digital imaging apparatus are of the same scale; and a computer including a database in which digital copies of the images are stored, wherein the computer has a plurality of condition data files stored therein, each condition file corresponding to an observable physical condition of the electrode column shown in one of the digital images, each condition data file including data indicating the observation of one or more of a plurality of defined recurring conditions in the associated digital image.

13. The system of claim 12, wherein:

the computer has a plurality of historical data files stored therein corresponding to historical parameters experienced by the electrode column.

* * * * *